United States Patent [19]

Ostrobrod

[11] Patent Number: 5,156,240
[45] Date of Patent: Oct. 20, 1992

[54] ROPE GRAB
[76] Inventor: Meyer Ostrobrod, 2070 Bennett Rd., Philadelphia, Pa. 19116
[21] Appl. No.: 708,302
[22] Filed: May 31, 1991
[51] Int. Cl.⁵ ............................................. F16G 11/10
[52] U.S. Cl. ..................................... 188/65.1; 182/5; 182/193; 188/65.2
[58] Field of Search ................... 188/65.1, 65.2; 182/5, 182/6, 7, 192, 193

[56] References Cited

U.S. PATENT DOCUMENTS

| | | | |
|---|---|---|---|
| 3,179,994 | 4/1965 | Meyer et al. | 188/65.2 X |
| 3,317,971 | 5/1967 | Meyer | 182/5 X |
| 3,811,155 | 5/1974 | Stafford | 182/5 X |
| 4,034,828 | 7/1977 | Rose et al. | 182/5 |
| 4,077,094 | 3/1978 | Swager | 182/5 X |
| 4,253,218 | 3/1981 | Gibbs | 188/65.1 X |

FOREIGN PATENT DOCUMENTS 2417988 10/1979 France ................... 182/5

*Primary Examiner*—George E. A. Halvosa
*Attorney, Agent, or Firm*—Norman E. Lehrer

[57] ABSTRACT

The rope grab safety device of the present invention releasably attaches a workman's safety belt lanyard to a vertically extending safety rope. The device includes a primary frame assembly constructed of an elongated U-shaped bracket having a pair of spaced apart parallel side plates which is adapted to fit around the rope. A secondary frame assembly also comprised of a pair of side plates is adapted to fit within the U-shaped bracket after the rope is inserted. The secondary frame assembly carries a brake lever and brake shoe which is adapted to engage the rope in the event of a fall. An elongated bent pin connected between the primary and secondary frame assemblies allows for limited pivotal and axial movement between them to thereby allow the rope to be inserted into the U-shaped bracket. A separate locking pin passes through aligned openings in the primary and secondary frame members to secure them together.

10 Claims, 3 Drawing Sheets

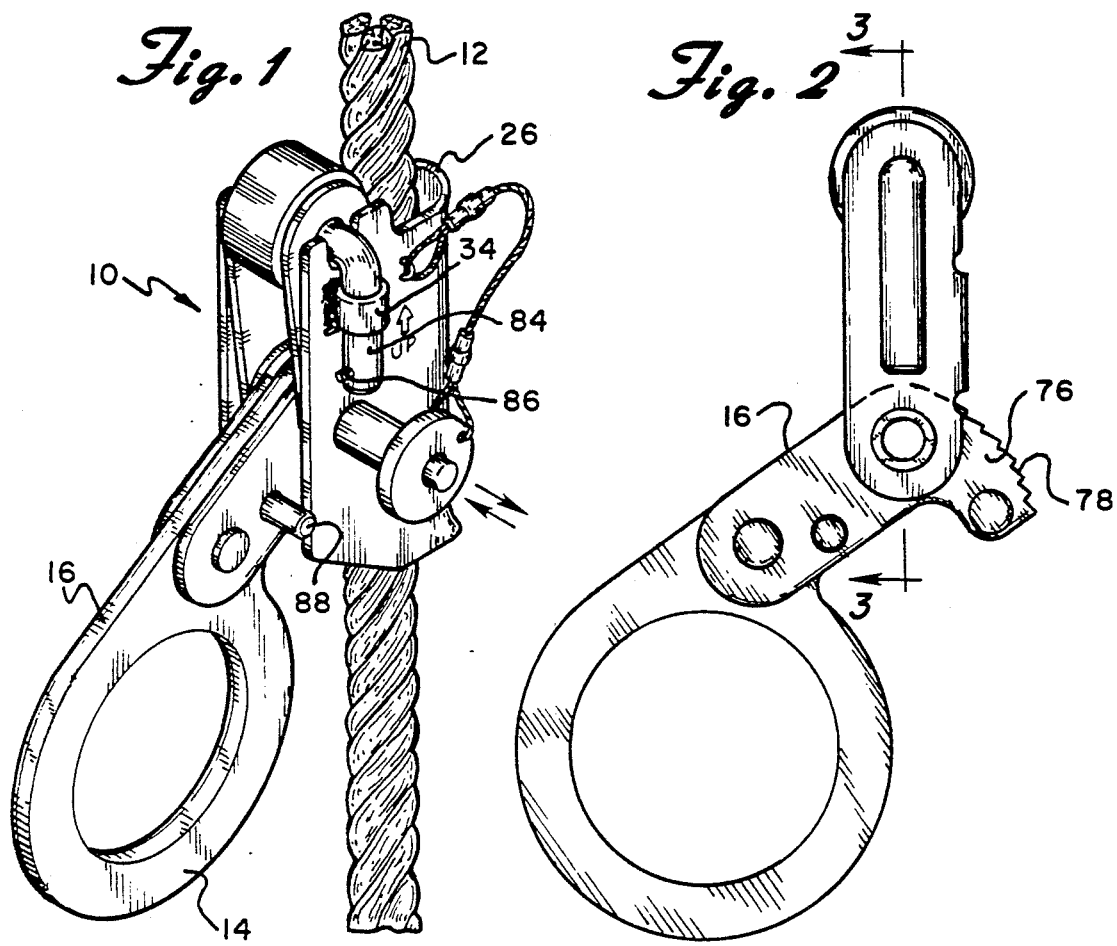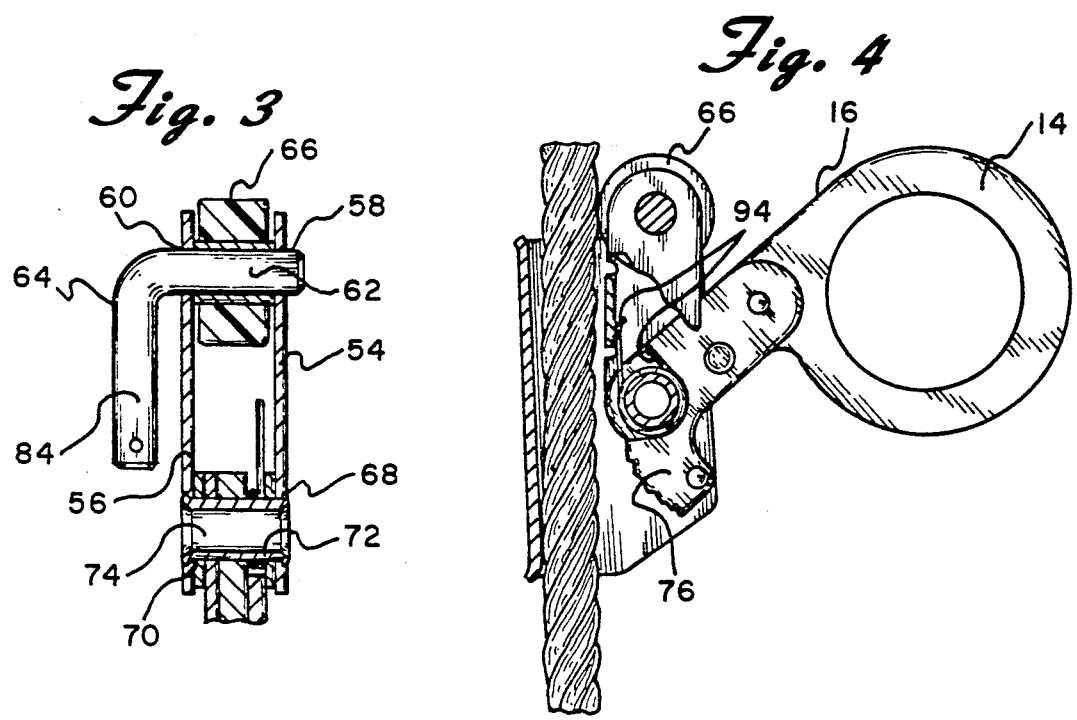

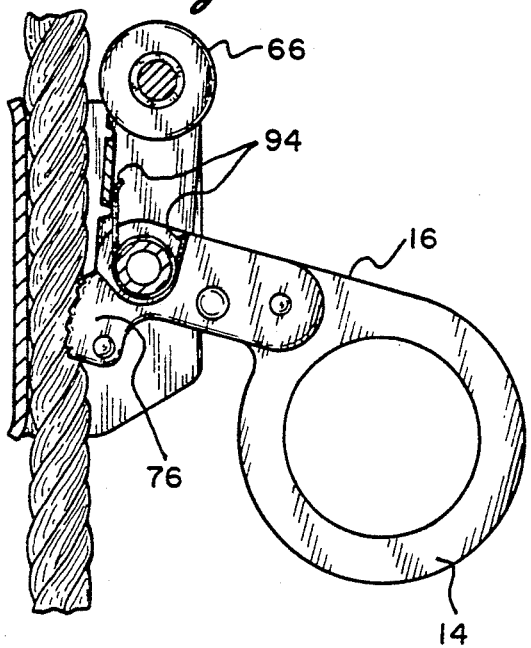
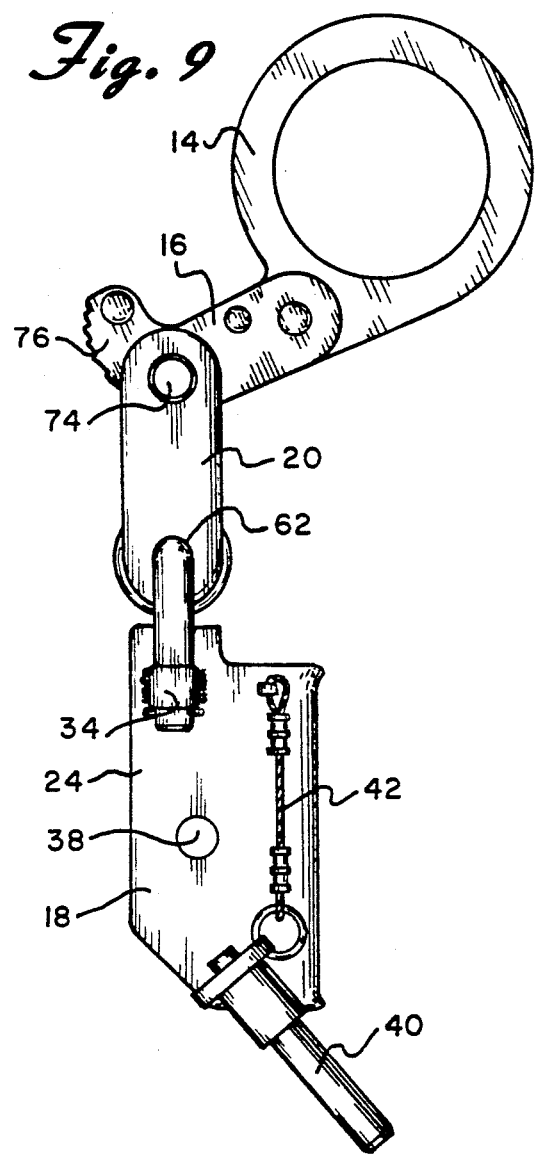
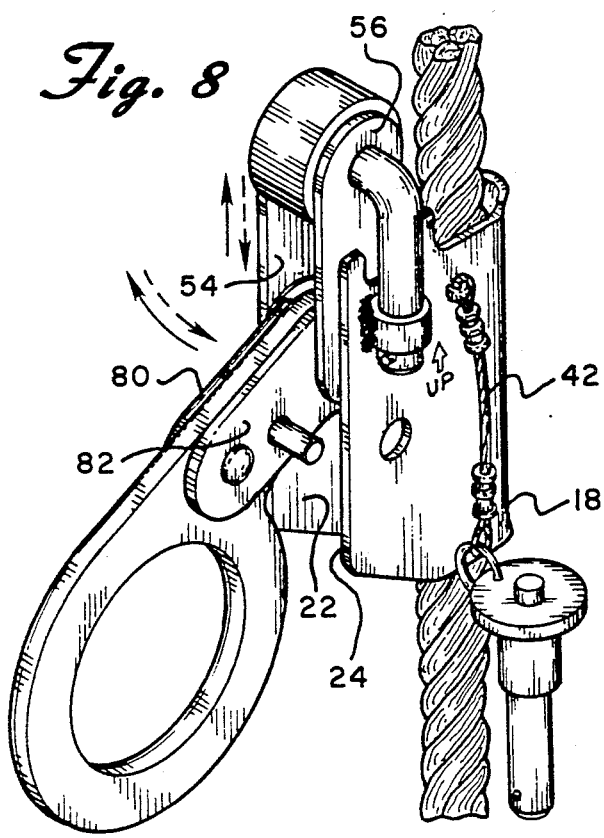
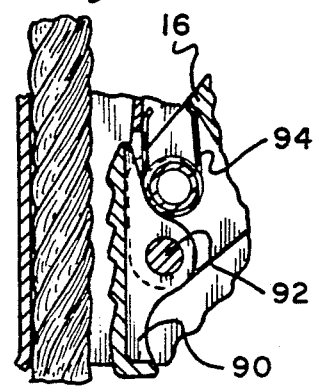

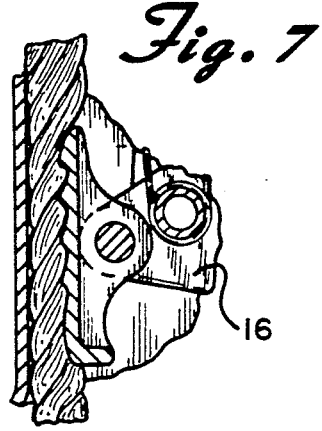
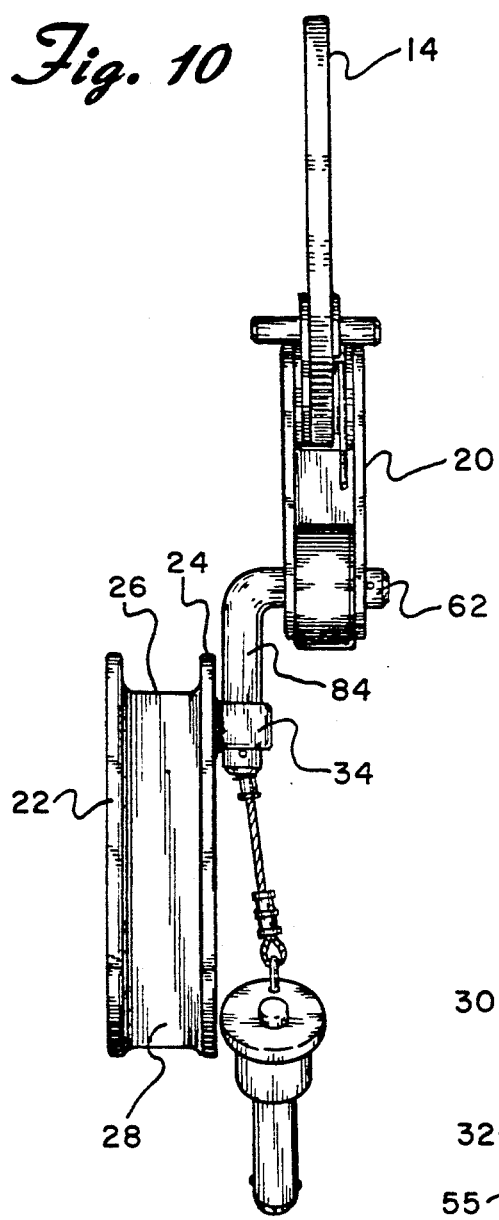
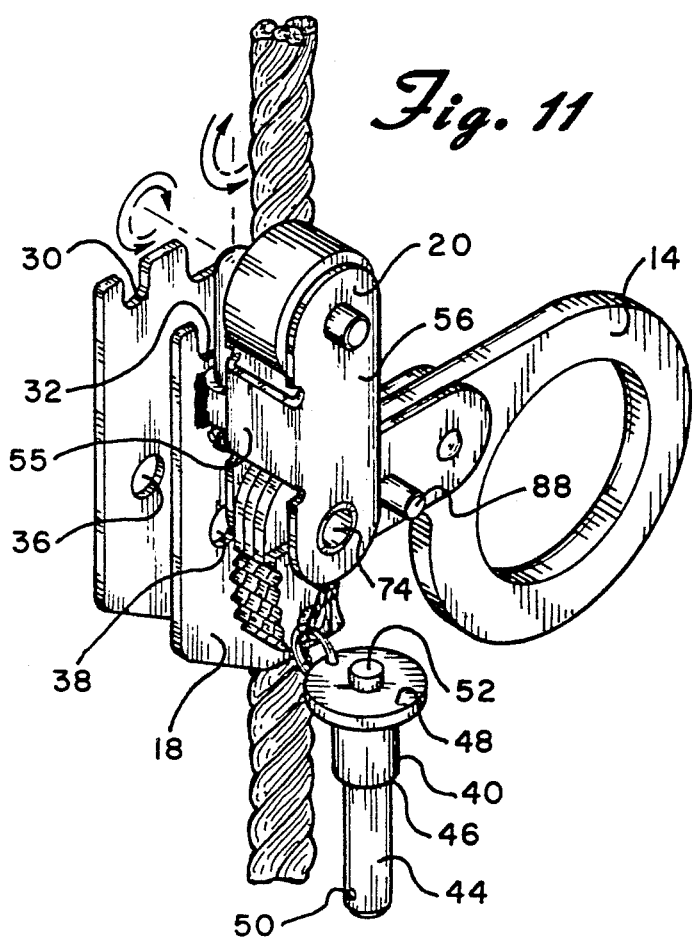

1

ROPE GRAB

BACKGROUND OF THE INVENTION

The present invention is directed toward a rope grab safety device and, more particularly, toward such a device which is intended to be used by a workman working in elevated places which allows him to freely move up or down but which will gradually and safely arrest his fall should he slip or otherwise fall from his work place.

Both in response to government rules and regulations and a general desire for safety, rope grabs or similar safety devices have become a requirement for workers working in elevated positions such as on scaffolding or on ladders or the like. Such rope grabs are used in conjunction with a vertical cable or rope which is suspended from a position above the worker to substantially the ground level where it is also secured so as to ensure that the rope is maintained in a vertical position.

Typical rope grabs are used in conjunction with a safety belt or harness which is fastened about the worker. A lanyard is secured to the safety belt or harness and the free end thereof is secured to the rope grab. The lanyard is relative short but is of sufficient length to allow the worker some freedom of movement in horizontal directions. An ideal rope grab should move freely up and down the rope as the worker slowly moves up or down relative to any position on the rope. However, in the event that the worker loses his balance or otherwise is caused to fall, the lanyard causes the rope grab to grip the rope, breaks the fall by gripping the rope which first slows the worker and eventually stops the fall within several feet.

Prior art rope grab devices have proven less than totally acceptable for several different reasons. Some types of rope grabs cannot be attached to or removed from the rope without the necessity of threading the end of the rope through the connector. This is not practical when the suspended rope is several hundred feet long. Hinging and clamping arrangements have been proposed as a solution to this problem but none of them have been found to be entirely satisfactory. The hinged device shown in U.S. Pat. No. 4,560,029, for example, has been known to deform upon stopping the fall of a fallen worker which deformation makes it difficult to operate safely thereafter.

Prior known devices and, particularly those of the hinged type, are also not easy to assemble on the rope. Assembly frequently requires a two-hand operation and, quite frequently, a worker working at an elevated position normally only has one hand free.

Another disadvantage found in many conventional rope grab devices is that they cannot be moved freely up or down the rope when the worker moves about. Many of these devices require that the worker hold the device in an open position with a hand grip in order to move the same. This may be difficult when the worker's hands are otherwise occupied. Furthermore, in the event of a fall, the worker may panic and may not release his grip which would cause the rope grab to malfunction and which would, of course, be disastrous to him.

Another serious problem of prior devices is the manner in which the rope grab grips the rope. The gripping mechanism of most rope grabs includes a cam-lever arrangement wherein a braking cam having teeth or serrated cam surfaces grips the cable. The force at which the cams grab the cable of these prior art devices is directly related to the weight of the worker and the short distance that he free falls before the rope grab is activated. The result is that the sudden stop can injure the worker. Furthermore, in safety tests required by law or regulations in many jurisdictions where a weight simulating a worker was dropped a short distance to simulate a fall, the suspended rope which may be a ⅝ or ¾ inch nylon or manilla rope was either broken or substantially weakened by the rope grab because of the sudden shock upon it and the cutting of the rope by the braking cams. The Occupational Safety and Health Administration (OSHA) has established standards which must be met for rope grabs and ropes used therewith. These are published at 29 CFR 1910 Appendix C. Many prior art devices, however, are not capable of meeting these requirements.

SUMMARY OF THE INVENTION

The present invention is designed to overcome the problems of the prior art devices described above and provides a rope grab safety device which releasably attaches a workman's safety belt lanyard to a vertically extending safety rope. The device includes a primary frame assembly constructed of an elongated U-shaped bracket having a pair of spaced apart parallel side plates which is adapted to fit around the rope. A secondary frame assembly also comprised of a pair of side plates is adapted to fit within the U-shaped bracket after the rope is inserted. The secondary frame assembly carries a brake lever and brake shoe which is adapted to engage the rope in the event of a fall. An elongated bent pin connected between the primary and secondary frame assemblies allows for limited pivotal and axial movement between them to thereby allow the rope to be inserted into the U-shaped bracket. A separate locking pin passes through aligned openings in the primary and secondary frame members to secure them together.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

FIG. 1 is a front perspective view of a rope grab constructed in accordance with the principles of the present invention as the same is used on a vertically suspended safety rope;

FIG. 2 is a side view showing the details of the braking mechanism of rope grab;

FIG. 3 is a cross-sectional view taken through the line 3—3 of FIG. 2;

FIG. 4 is a view shown partially in cross section of the interior of the rope grab shown in FIG. 1 and showing the manner in which the rope grab can freely move up and down on the vertical safety rope;

FIG. 5 is a view similar to FIG. 4 but showing the rope grab in its braking condition;

FIG. 6 is a view similar to FIG. 4 but showing an alternate braking mechanism;

FIG. 7 illustrates the braking mechanism of FIG. 6 in operation, and

FIGS. 8-11 illustrate the manner in which the interior braking mechanism of the rope grab is sequentially separated from and rotated out of the housing of the rope grab so that the same can be connected to or disassembled from the safety rope.

DETAILED DESCRIPTION OF THE PREFERRED EMBODIMENTS

Referring now to the drawings in detail wherein like reference numerals have been used throughout the various figures to designate like elements, there is shown in FIG. 1 a rope grab safety device constructed in accordance with the principles of the present invention and designated generally as 10. Rope grab 10 is shown in place on a vertically extending safety rope 12. Rope 12 may be only 25 or 50 feet long or may be hundreds of feet long. It may be comprised of a natural fiber material or of a synthetic material such as nylon or the like and has a diameter of ⅝ inch or ¾ inch. The thickness of the rope 12 and other specifications concerning the same are regulated by federal regulations and the regulations in several states. Furthermore, and as will be made clearer below, the rope grab 10 is designed to be used with a particular size rope. That is, various different sizes of rope grabs will be made available for different size ropes.

As is well known in the art, the rope grab is connected to a worker who may be working on a scaffold or platform or ladder or the like at an elevated location through the use of a lanyard (not shown) is between 36 to 42 inches long in accordance with OSHA requirements. The lanyard is connected to the worker through a safety belt or harness worn by the worker. The other end of the lanyard is connected to the rope grab 10 through loop 14 carried at the end of the brake lever 16, the details of which will be explained more fully hereinafter.

The length of the lanyard allows the worker to move in a horizontal direction to either side of the safety rope 12. As the worker moves higher, the lanyard pulls up on the brake lever 16 which, in turn, pulls the entire rope grab 10 upwardly with the worker. As long as the lanyard is above the height of the rope grab 10, the weight of the main portion of the rope grab maintains the lever 16 in its upward position so that the entire rope grab can freely move downwardly along the safety rope 12 as the worker descends slowly. Of course, should the worker fall, the lever 16 will move downwardly into its braking position and the work grab 10 will arrest the fall of the worker. The details of the brake function of the rope grab 10 will be explained in more detail below.

Rope grab 10 is comprised essentially of two parts: a primary frame assembly 18 and a secondary frame assembly 20. Primary frame assembly 18 is comprised essentially of an elongated U-shaped bracket having a pair of parallel side plates 22 and 24 which are spaced apart a distance sufficient to receive rope 12 therebetween. The rear end of each of the side plates 22 and 24 are joined together along the entire vertical length thereof by a curved connecting portion 26 having an interior surface 28.

Vertically extending notches 30 and 32 are formed in the top edges of the walls 22 and 24, respectively, adjacent the forward ends thereof. Welded or otherwise secured to the outer face of the wall 24 is a ring 34. Ring 34 is located just below the notch 32 and in substantial alignment therewith with the axis of the opening in ring 34 vertically oriented.

Side plates 22 and 24 are also provided with aligned openings 36 and 38. Openings 36 and 38 are located below the notches 30 and 32 and slightly inwardly thereof. The primary frame assembly 18 also carries a locking pin 40 which is suspended from the wall 24 by way of a short, flexible wire 42. Wire 42 allows the locking pin 40 to be inserted into place and removed without losing the same. Locking pin 40 includes an elongated barrel portion 44 which is adapted to pass through the openings 38 and 36. A stop member 46 located between the barrel portion 44 and the head 48 of the pin 40 limits the extent to which the pin 40 can be inserted through the openings 38 and 36. As is best seen in FIG. 1, when the pin 40 is in place, a portion of the same remains exposed adjacent the outer surface of the wall 24. This distance is sufficient to permit the worker's fingers to be inserted between the head 48 of the pin 40 and the wall 24. Pin 40 is held in place by a spring-loaded ball 50 located on the circumference of the barrel 44 adjacent the free end thereof. When the pin 40 is in the position shown in FIG. 1, the remote end of the barrel 40 extends past the wall 22 and the ball 50 is exposed thereby functioning as a lock to prevent the pin from being pulled out. When it is desired to remove the pin, button 52 in the head 48 is depressed thereby allowing the ball 50 to move inwardly and preventing the same from functioning as a lock. Locking pin such as that shown at 40 are, per se, known. Accordingly, it is not believed that a detailed explanation of the internal operation thereof is necessary.

The secondary frame assembly 20 is comprised of a second pair of parallel spaced apart side plates 54 and 56 which are joined together at the center back thereof by connecting plate 55. As shown most clearly in FIGS. 1 and 8, the secondary frame assembly 20 is adapted to fit within the U-shaped bracket on the primary frame assembly 18. As shown in FIG. 4, however, the secondary frame assembly 20 is located adjacent the front of the walls 22 and 24 so that a space remains between the secondary frame assembly 20 and the interior surface 28 of the rear wall 26. This space, of course, is sufficiently large to allow the rope 12 to pass freely therethrough.

As shown most clearly in FIG. 3, the upper portion of each of the plates 54 and 56 includes an opening therein as shown at 58 and 60, respectively. The horizontal portion 62 of a bent or L-shaped rod 64 extends through the openings 58 and 60 and extends outwardly a short distance from either side thereof. A freely rotatable roller 66 is mounted on the axle formed by the horizontal portion 62 of the rod 64 in the space between the plates 54 and 56.

Openings 68 and 70 are similarly formed in the side plates 54 and 56, respectively, adjacent the lower end thereof. A bushing 72 having an opening 74 is fitted into the openings 68 and 70 and is secured thereto. As shown most clearly in FIGS. 2-5, brake lever 16 is pivotally secured to the bushings 72 for limited rotation about the same.

Ring 14, as pointed out above, is formed at one end of the brake lever 16. The other free end of the brake lever which lies within the main body of the rope grab 10 includes a brake 76 in the form of a serrated cam surface such as shown at 78. This cam brake 76 is adapted to engage the rope 12 when the rope grab is used to prevent a fall as will be explained in more detail hereinafter. In order to strengthen the brake by widening the same which also prevents the brake from damaging the rope, the forward end of the brake lever is provided with a pair of auxiliary side levers and brakes such as shown at 80 and 82. These reinforcing side elements are shaped substantially the same as the forward end of the brake lever.

The L-shaped rod member 64 also includes a vertically extending portion 84. This vertical extension is adapted to pass down through the opening in the ring 34 which is secured to the side wall 24. The interfit between the rod portion and the ring 34 allows the rod to rotate about its vertical axis along with the remaining parts of the secondary frame assembly 20 and also permits the same to move up and down as shown in FIGS. 1 and 8. Only limited vertical motion is allowed, however, due to the stop means formed by the cotter pin 86 fitted into an opening in the extreme end of the rod portion 84.

When the secondary frame assembly 20 is properly fitted into the primary frame assembly 18 as shown in FIG. 1, the side of the horizontal portion 62 of rod 64 fits down into the notches 30 and 32 of the side walls 22 and 24 and the opening 74 in the bushing 72 is in alignment with the openings 36 and 38 also in the side walls 22 and 24. In this position, the pin 40 can be inserted through these openings to lock the parts together.

FIG. 4 illustrates a cross section of the center of the rope grab in operation. It can be seen that when the loop 14 of the lever 16 is raised, the brake cam 76 is held away from the rope 12 so that the rope grab can move up and down the length of the rope 12 without restriction. The roller 66 helps to guide the movement of the rope grab and prevent binding. In the event of a fall, however, the loop 14 moves downwardly so that the brake 76 engages the rope 12 as shown in FIG. 5.

In order to prevent the brake 76 from cutting through or weakening the rope 12, the brake lever 16 is provided with a stop mechanism in the form of a pin 88 which extends outwardly from the side of the auxiliary plate 82. In its full downward or braking position such as shown in FIGS. 1 and 5, the pin 88 engages the outer edge of the wall 24 to limit the movement of the brake 76 into the rope 12.

It should be noted that the size and dimensions of the brake 76, the location of the pin 88 and the size of the primary frame assembly 18 are all specifically designed to accommodate a particular size rope 12. In other words, if a larger rope is used, then the space between the brake 76 and the interior surface 28 of the U-shaped member must be made larger so that the brake will not be able to be forced too deeply into the rope. Similarly, if a smaller rope is used, then a smaller opening must be provided. In each case, the dimensions are chosen so as to permit the rope grab to first decelerate the falling worker by gradually slowing him within a predetermined limited distance and then stopping him but without the brake 76 having unlimited movement into the rope 12.

A slightly modified form of the brake arrangement is shown in FIGS. 6 and 7. In lieu of the brake 76 being connected directly to the end of the brake lever 16, a brake shoe or dog 90 can be pivoted to the end of the lever 16 at pivot point 92. As can be seen in FIGS. 6 and 7, when the brake 90 is engaged, a larger and flatter portion of the same engages the rope 12. This type of arrangement may be particularly useful for certain types of ropes which may still be damaged by the serrated brake 76 which engages the rope at a much smaller surface area thereby increasing the force thereon.

Whether the brake arrangement shown in FIGS. 4 and 5 or the one shown in FIGS. 6 and 7 is used, the brake lever is provided with a biasing leaf spring 94. Spring 94 biases the lever in a downward direction wherein the brake 76 or 90 would tend to engage the rope 12. However, the leaf spring 94 has a relatively weak force and is easily overcome by the slightest upward tension on the lanyard attached to the loop 14. This allows the worker to ascend or descend with the rope grab moving along with him and without the need for the worker to manually handle the rope grab 10.

The manner in which the rope grab 10 is assembled or disassembled on or from the rope 12 is best shown by viewing FIGS. 1 and 8-11 in sequence. FIG. 1 shows the rope grab 10 already assembled on the rope 12. In order to disassemble the same, button 52 is depressed and the pin 40 is removed. The secondary frame assembly 20 is then lifted straight upwardly as shown in FIG. 8. At this point, loop 14 is raised upwardly so that the secondary frame assembly 20 pivots about the horizontal axis of the pin portion 62 until it is substantially up and over the top of the primary frame assembly as shown in FIG. 9. The entire secondary frame assembly 20 is then rotated about the vertical axis of the portion 84 of the pin 64 until it lies to the side of the primary frame assembly as shown in FIG. 10. The secondary frame assembly 20 is then again rotated downwardly so that it rests on the side of the sidewall 24 as shown in FIG. 11. At this point, the entire device can be separated from the rope 12. Obviously, the rope grab 10 is assembled onto the rope by simply reversing the foregoing sequence.

The present invention may be embodied in other specific forms without departing from the spirit or essential attributes thereof and accordingly reference should be made to the appended claims rather than to the foregoing specification as indicating the scope of the invention.

I claim:

1. A safety device for the attachment of a safety belt lanyard to a vertically extending safety rope comprising:

a primary frame assembly comprised of an elongated U-shaped bracket having a pair of parallel side plates spaced apart a distance sufficient to receive a rope therebetween, said side plates being joined together along a length thereof by a connecting portion having an interior surface;

a secondary frame assembly comprised of a second pair of parallel spaced apart side plates, said secondary frame assembly having an upper end and a lower end as viewed in its operable position and being adapted to fit within said U-shaped bracket and spaced from said interior surface;

a brake cam means pivotally mounted to said secondary frame assembly adjacent the lower end thereof and between said second pair of side plates;

a cylindrically shaped roller pivotally mounted to said secondary frame assembly adjacent the upper end thereof and between said second pair of side plates;

means mounting said secondary frame assembly to said primary frame assembly to allow both rotational movement about an axis of rotation and longitudinal axial movement between said frame assemblies, said mounting means including an L-shaped rod member including a horizontal portion carried by said secondary frame assembly and a vertical leg pivoted to the exterior surface of one of said side plates of said primary frame assembly, and means for locking said secondary frame assembly to said primary frame assembly with said secondary frame assembly fitted within said U-shaped bracket.

2. The safety device as claimed in claim 1 wherein said locking means comprises aligned openings in each of the side plates of said primary and secondary frame assemblies and an elongated pin adapted to extend through said openings.

3. The safety device as claimed in claim 2 including means for preventing said pin from being removed from said openings.

4. The safety device as claimed in claim 1 wherein each of said side plates of said primary frame assembly includes an upper edge having a notch therein and wherein the ends of the horizontal portion of said rod member are adapted to fit within said notches.

5. The safety device as claimed in claim 1 wherein said brake cam means includes a brake lever and a brake shoe, said brake lever being pivotally mounted to said secondary frame assembly and including an end adapted to lie within said primary frame assembly, said brake shoe being carried by said end of said brake lever at a position facing said interior surface of said connecting portion.

6. The safety device as claimed in claim 5 including means for limiting the movement of said brake shoe toward said interior surface.

7. The safety device as claimed in claim 6 wherein said brake shoe is integral with said brake lever.

8. The safety device as claimed in claim 6 wherein said brake shoe is pivotally connected to said end of said brake lever.

9. The safety device as claimed in claim 6 wherein said brake lever includes a free end having means for connecting the same to said lanyard.

10. The safety device as claimed in claim 6 further including spring means biasing said shoe toward said interior surface.

* * * * *